(12) United States Patent
Sydow et al.

(10) Patent No.: US 12,547,387 B2
(45) Date of Patent: Feb. 10, 2026

(54) DETECTING CODE ANOMALIES IN SOURCE CODE USING MACHINE LEARNING TECHNIQUES

(71) Applicant: Dell Products L.P., Round Rock, TX (US)

(72) Inventors: David C. Sydow, Merrimack, NH (US); Anil Kumar Koluguri, Durham, NC (US); Shreyans Jasoriya, Brighton, MA (US); Songlin Hou, Worcester, MA (US); Gajanan S. Natu, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 293 days.

(21) Appl. No.: 18/099,061

(22) Filed: Jan. 19, 2023

(65) Prior Publication Data

US 2024/0265101 A1    Aug. 8, 2024

(51) Int. Cl.
   *G06F 8/41* (2018.01)
(52) U.S. Cl.
   CPC . *G06F 8/43* (2013.01); *G06F 8/42* (2013.01)
(58) Field of Classification Search
   CPC .................................... G06F 8/43; G06F 8/42
   See application file for complete search history.

(56) References Cited

U.S. PATENT DOCUMENTS

| 2019/0228319 | A1* | 7/2019 | Gupta | G06F 8/71 |
| 2021/0240453 | A1* | 8/2021 | Badlani | G06F 8/42 |
| 2021/0271587 | A1* | 9/2021 | Miller | G06F 11/3644 |
| 2024/0028740 | A1* | 1/2024 | Chan | G06F 21/577 |

OTHER PUBLICATIONS

Sonnekabl "Machine-Learning Supported Vulnerability Detection in Source Code" (Year: 2019).*
Sharma et al., "A Survey on Machine Learning Techniques for Source Code Analysis" (Year: 2022).*

(Continued)

*Primary Examiner* — Phillip H Nguyen
(74) *Attorney, Agent, or Firm* — Ryan, Mason & Lewis, LLP

(57) ABSTRACT

Methods, apparatus, and processor-readable storage media for detecting code anomalies using machine learning techniques are provided herein. An example computer-implemented method includes parsing source code from at least one code repository to create a plurality of tokens based on a syntax corresponding to a programming language of the source code; processing the plurality of tokens using a first machine learning model to create a corresponding plurality of input embeddings; processing the plurality of input embeddings using a second machine learning model, wherein the second machine learning model is configured to detect one or more code anomalies across a plurality of programming languages and trained based at least in part on a training dataset corresponding to the at least one code repository; and causing one or more automated actions to be performed in response to the second machine learning model detecting at least one anomaly in the source code.

20 Claims, 7 Drawing Sheets

(56) References Cited

OTHER PUBLICATIONS

Li, Zhiyu, et al. "Automating Code Review Activities by Large-Scale Pre-Training", available at: https://arxiv.org/pdf/2203.09095.pdf (last accessed Jan. 19, 2023), Oct. 11, 2022.

Feng, Zhangyin, et al. "CodeBERT: A Pre-Trained Model for Programming and Natural Languages" available at: https://arxiv.org/pdf/2002.08155.pdf (last accessed Jan. 19, 2023), Sep. 18, 2020.

Transformer (machine learning model), https://en.wikipedia.org/w/index.php?title=Transformer_(machine_learning_model)&oldid=1134553101 (last visited Jan. 19, 2023).

\* cited by examiner

DETECTING CODE ANOMALIES IN SOURCE CODE USING MACHINE LEARNING TECHNIQUES

FIELD

The field relates generally to information processing systems, and more particularly to code analysis in such systems.

BACKGROUND

Static code analysis generally refers to a process for analyzing one or more software applications, or portions thereof, without executing them. Static code analysis techniques often rely on a set of static rules to ensure that the source code of a given application follows a specific structure. Such rules are difficult to maintain and often need to be created for a particular programming language, thereby reducing their effectiveness.

SUMMARY

Illustrative embodiments of the disclosure provide techniques for detecting code anomalies using machine learning techniques. An exemplary computer-implemented method includes parsing source code from at least one code repository to create a plurality of tokens based at least in part on a syntax corresponding to a programming language of the source code; processing the plurality of tokens using a first machine learning model to create a corresponding plurality of input embeddings; processing the plurality of input embeddings using a second machine learning model, wherein the second machine learning model is configured to detect one or more code anomalies across a plurality of programming languages and trained based at least in part on a training dataset corresponding to the at least one code repository; and causing one or more automated actions to be performed in response to the second machine learning model detecting at least one anomaly in the source code.

Illustrative embodiments can provide significant advantages relative to conventional anomalous code detection techniques. For example, technical problems associated with detecting complex logical and/or syntax anomalies are mitigated in one or more embodiments by transforming source code into a format that can be processed by a machine learning framework to identify such anomalies. The machine learning framework, in some embodiments, is configured to efficiently process source code in a plurality of different programming languages.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
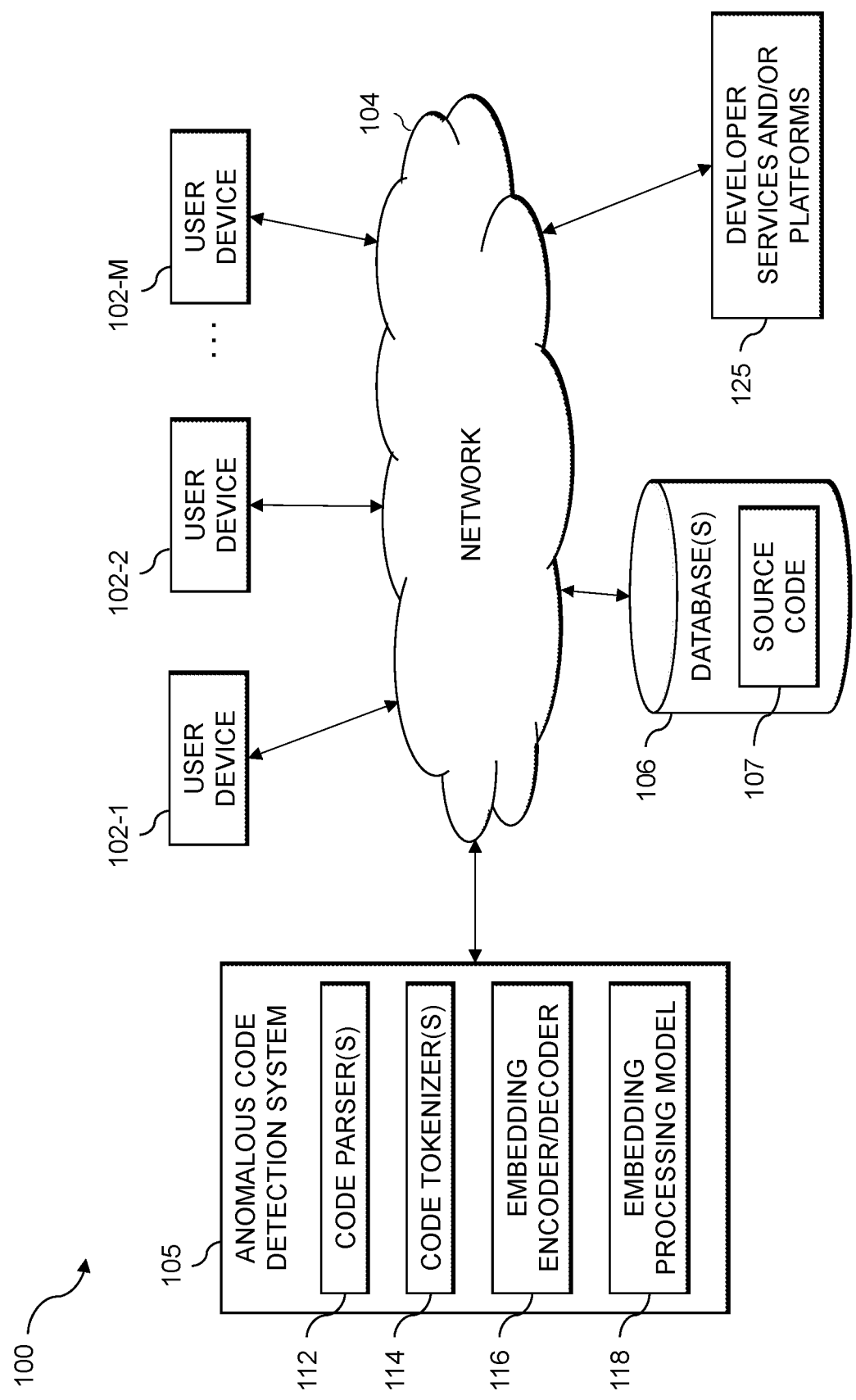
FIG. 1 shows an information processing system configured for detecting code anomalies using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an anomalous code detection system 105. The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the anomalous code detection system 105 can have at least one associated database 106 configured to store source code 107 pertaining to, for example, one or more software applications and/or services.

An example database 106, such as depicted in the present embodiment, can be implemented using one or more storage systems associated with the anomalous code detection system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the anomalous code detection system 105 are one or more input-output devices, which illustratively comprise keyboards, displays or other types of input-output devices in any combination. Such input-output devices can be used, for example, to support one or more user interfaces to the anomalous code detection system 105, as well as to support communication between anomalous code detection system 105 and other related systems and devices not explicitly shown.

Additionally, the anomalous code detection system 105 in the FIG. 1 embodiment is assumed to be implemented using at least one processing device. Each such processing device generally comprises at least one processor and an associated memory, and implements one or more functional modules for controlling certain features of the anomalous code detection system 105.

More particularly, the anomalous code detection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface may allow the anomalous code detection system 105 to communicate over the network 104 with the user devices 102, and illustratively comprises one or more conventional transceivers.

The anomalous code detection system 105 further comprises one or more code parsers 112, one or more code tokenizers 114, an embedding encoder/decoder 116, and an embedding processing model 118.

Generally, the one or more code parsers 112 obtain and process at least a portion of source code 107 so that it can be processed by the one or more code tokenizers 114. For example, in some embodiments, the one or more code parsers 112 can combine the source code 107 into one or more files, where all comments have been removed. In at least one embodiment, dependent symbols (e.g., corresponding to variables that vary according to changes in other variables) can also be extracted from the source code 107. The code parsers 112 may include a plurality of code parsers that are configured to process source code in a corresponding plurality of programming languages.

The one or more code tokenizers 114 obtain the output of the code parsers 112 and tokenize the preprocessed source code. For example, the one or more code tokenizers 114 can generate a set of tokens that represent the source code 107 in a natural language form, as explained in more detail in conjunction with FIG. 2, for example.

The embedding encoder/decoder 116 is configured to generate embeddings (e.g., feature vectors) for the set of tokens output by the one or more code tokenizers 114. In at least one embodiment, the embedding encoder/decoder 116 can comprise a machine learning model (such as a skip-gram machine learning model or a transformer-based model such as RoBERTa) that converts the tokens into scalar values. As an example, a scalar value for a given token may be in the form of a vector, where each dimension of the vector encodes a feature of the token. Such vectors can be generated by the machine learning model to incorporate the contextual meaning of the given token with respect to other tokens. The embedding encoder/decoder 116 can also convert the generated embeddings into a two-dimensional array or embedding matrix, which can be provided as input to the embedding processing model 118.

The embedding processing model 118 processes the embeddings generated by the embedding encoder/decoder 116 to detect code anomalies. The embedding processing model 118 can be implemented as a machine learning model that sequentially processes the embeddings to detect the code anomalies. The embedding processing model 118 model, in some embodiments, can be implemented as a long short-term memory (LSTM) model, as described in more detail in conjunction with FIG. 3. In some embodiments, the embedding processing model 118 can be implemented as a transformer-based model (e.g., a CodeBERT model). Code-BERT is a machine learning model that is developed with a multilayer transformer architecture and is trained on multiple programming languages. A CodeBERT model can be trained on both bimodal and unimodal data. A bimodal datapoint includes individual functions with paired documentation (e.g., from comments in source code), and unimodal datapoints can include functions without paired documentation.

In some embodiments, the output of the embedding processing model 118 can be in the form of a vector of numbers. The vector can be decoded by the embedding encoder/decoder 116 to convert it into a human-readable code file.

Optionally, the computer network 100 can further include one or more other developer services and/or platforms 125. For example, the developer services and/or platforms 125 can include tools (e.g., online issue tracking systems such as Jira) or code management services (e.g., code repository services such as GitHub), which can integrate with the anomalous code detection system 105, as described in more detail elsewhere herein. Although the developer services and/or platforms 125 are shown separate from the user devices 102 and anomalous code detection system 105, it is to be appreciated that in other embodiments the developer services and/or platforms 125 can be at least partially implemented on one or more of the user devices 102, for example. As an example, the developer services and/or platforms 125 can comprise an integration developer environment (IDE) that can be executed by a given one of the user devices 102 and can integrate with the anomalous code detection system 105.

It is to be appreciated that this particular arrangement of elements 112, 114, 116, and 118 illustrated in the anomalous code detection system 105 of the FIG. 1 embodiment is presented by way of example only, and alternative arrangements can be used in other embodiments. For example, the functionality associated with the elements 112, 114, 116, and 118 in other embodiments can be combined into a single module, or separated across a larger number of modules. As another example, multiple distinct processors can be used to implement different ones of the elements 112, 114, 116, and 118 or portions thereof.

At least portions of elements 112, 114, 116, and 118 may be implemented at least in part in the form of software that is stored in memory and executed by a processor.

It is to be understood that the particular set of elements shown in FIG. 1 for anomalous code detection system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the anomalous code detection system 105 and database(s) 106 can be on and/or part of the same processing platform.

An exemplary process utilizing elements 112, 114, 116, and 118 of an example anomalous code detection system 105 in computer network 100 will be described in more detail with reference to, for example, the flow diagram of FIG. 5.

Figure 2:
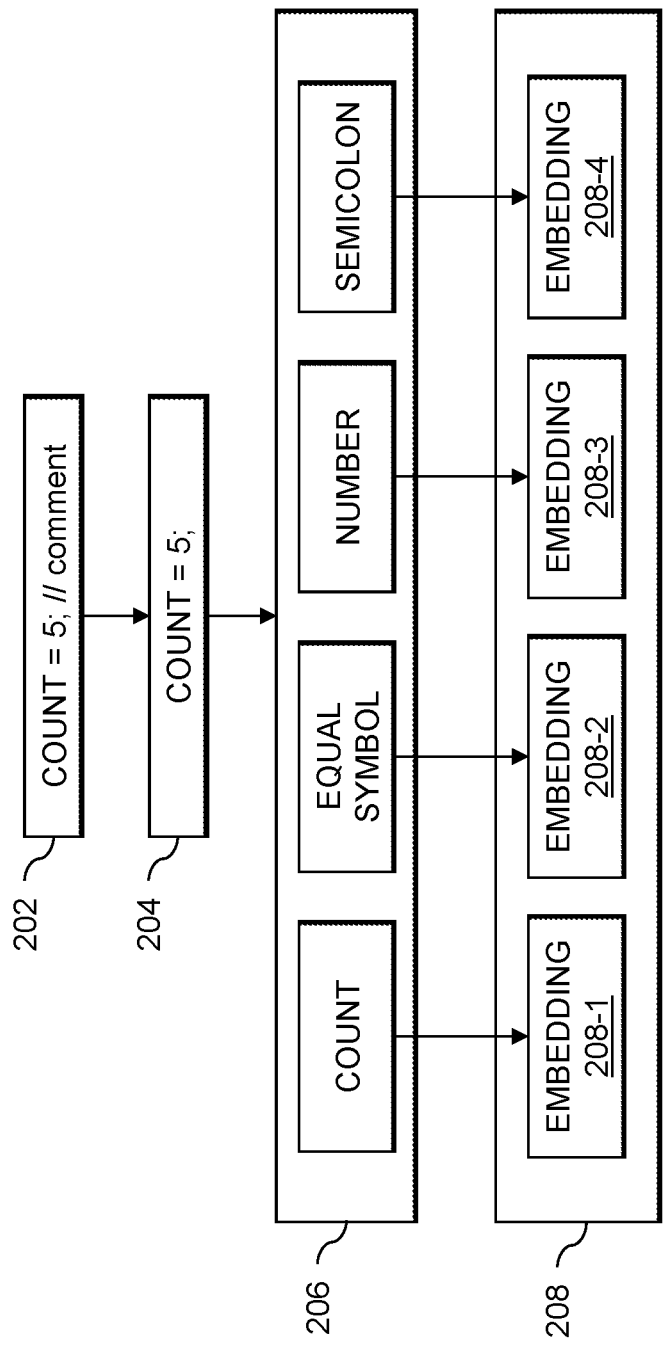
FIG. 2 shows an example of source code being converted into a set of embeddings in an illustrative embodiment.

FIG. 2 shows an example of source code 202 being converted into a set of embeddings 208 in an illustrative embodiment. In this example, the source code 202 comprises the statement COUNT=5; // comment. It is assumed in this example that '//' is defined as a comment symbol for the programming language. The source code 202 is processed (e.g., by the one or more code parsers 112) to remove the comments as shown by modified source code 204. Removing the comments from the source code provides more accurate results, as words in the comments can skew machine learning results (e.g., corresponding to the embedding encoder/decoder 116 and/or the embedding processing model 118). The comments can be removed, for example, using one or more regular expressions.

The modified source code 204 is then processed (e.g., by the one or more code tokenizers 114) to generate a set of tokens 206. Generally, the set of tokens is generated based at least in part on whitespace in the source code. The whitespace is used to separate the source code into individual values or symbols, for example, which can then be analyzed to determine whether they relate to syntax of the programming language. Thus, in the example shown in FIG. 2, the modified source code 204 is split into a set of tokens 206, where the first token is "count"; the second token is "equal symbol"; the third token is "number"; and the fourth token is "semicolon". It is noted that the symbols relating to syntax, specifically, the "=" and the ";" have been replaced with natural language tokens. Also, in some embodiments, generalized tokens are used to replace strings and constant values in the source code, as constant values (e.g., integers, floats, etc.) often do not improve the results of the machine learning model. Thus, in the FIG. 2 example, the constant value "5" has been replaced with a general token ("number"). Generating the set of tokens 206 based on whitespace (as opposed to tokenizing an entire line of code) can provide improved results as more context can be considered. As another example, tokenizing the code string: "A+=B;" by line will often remove the capability of a machine learning model to determine that the operation is adding variable A to variable B, whereas this context can be provided by tokenizing according to whitespace.

The set of tokens 206 is processed to generate a corresponding set of embeddings 208, which includes embeddings 208-1 to 208-4. As noted elsewhere herein, the set of embeddings 208 can be generated using techniques that capture the context of the tokens, which is an important aspect for properly detecting logic errors or anomalies. Accordingly, one or more embodiments implement a machine learning model that captures such context, such as a skip-gram machine learning model. Generally, a skip-gram machine learning model is a neural network having a single hidden layer that is trained in an unsupervised manner. For a given word in a set of words, the skip-gram neural network model is trained to predict the surrounding context of the word. For example, a skip-gram neural network model can be trained to output a probability of finding a specific word at each position within a specified context window. By way of example, consider the following source code:

1: public static void main(String[ ] args) {
2: console·println("Hello, World!");
3: }

According to some embodiments, the code can be parsed (e.g., by code parsers 112) to abstract the variable and/or function (or method) names. For example, the one or more code parsers 112 can process the code and output: "public static void METHOD_1 (TYPE_1 [ ] VAR_1) {VAR_2·METHOD_2 (STRING_1);". This output is then processed to generate a set of embeddings (e.g., by embedding encoder/decoder 116), which are then processed (e.g., by the embedding processing model 118). The output of the embedding processing model 118 is decoded back into an abstract code form (e.g., by embedding encoder/decoder 116). The abstract code form is also processed by the one or more code parsers 112 so that it can be mapped to its original variable and/or function names.

In some embodiments, the embeddings can be processed using a sequential machine learning model, such as a recurrent neural network (RNN). For example, the RNN can process the embeddings sequentially, where each embedding (or word) in the input is currently associated with a specific time step. At each time step, t, activation values (also referred to as hidden states) are calculated and will be passed along to the next time step. The hidden states contain information related to what the machine learning framework has already seen in previous time steps. At each stage, the current hidden state, $a^{<t>}$, is calculated using the current input, $x^{<t>}$, and the previously hidden form, $a^{<t-1>}$. The following equation may be used: $a^{<t>}=g(W_{aa}a^{<t-1>}+W_{ax}x^{<t>}+b_a)$, where the function g refers to an activation function (typically tanh or sigmoid function). Also, the $W_{aa}$ and $W_{ax}$ terms refer to the weight matrices, and $b_a$ is a bias value being added. It is noted that the subscript ax in $W_{ax}$, denotes that this matrix is used when calculating $a^{<t>}$ from $x^{<t>}$ using the dot product of the two. This notation also applies to the $W_{aa}$ matrix. Both weight matrices are shared at each time step.

At the last time step, the dot product of the activation values and a third matrix, $W_{ya}$ is computed, and provided to a sigmoid function. The sigmoid function computes a discrete output, between 0 and 1, which represents how confident the model is that the input contains an anomaly.

The weight matrices can be updated through an improvement process referred to as backpropagation through time. For example, in some embodiments, a loss function measures how far off a desired output is from the actual production. Since this is a classification problem, a binary cross entropy cost function can be used as the loss function. To reduce (e.g., minimize) the loss function, the derivatives of the loss function for the weights and biases are computed, and these gradients are used to update the parameters.

According to some embodiments, a recurrent unit (e.g., an LSTM cell) can be used to improve the model with respect to long-range dependencies.

Figure 3:
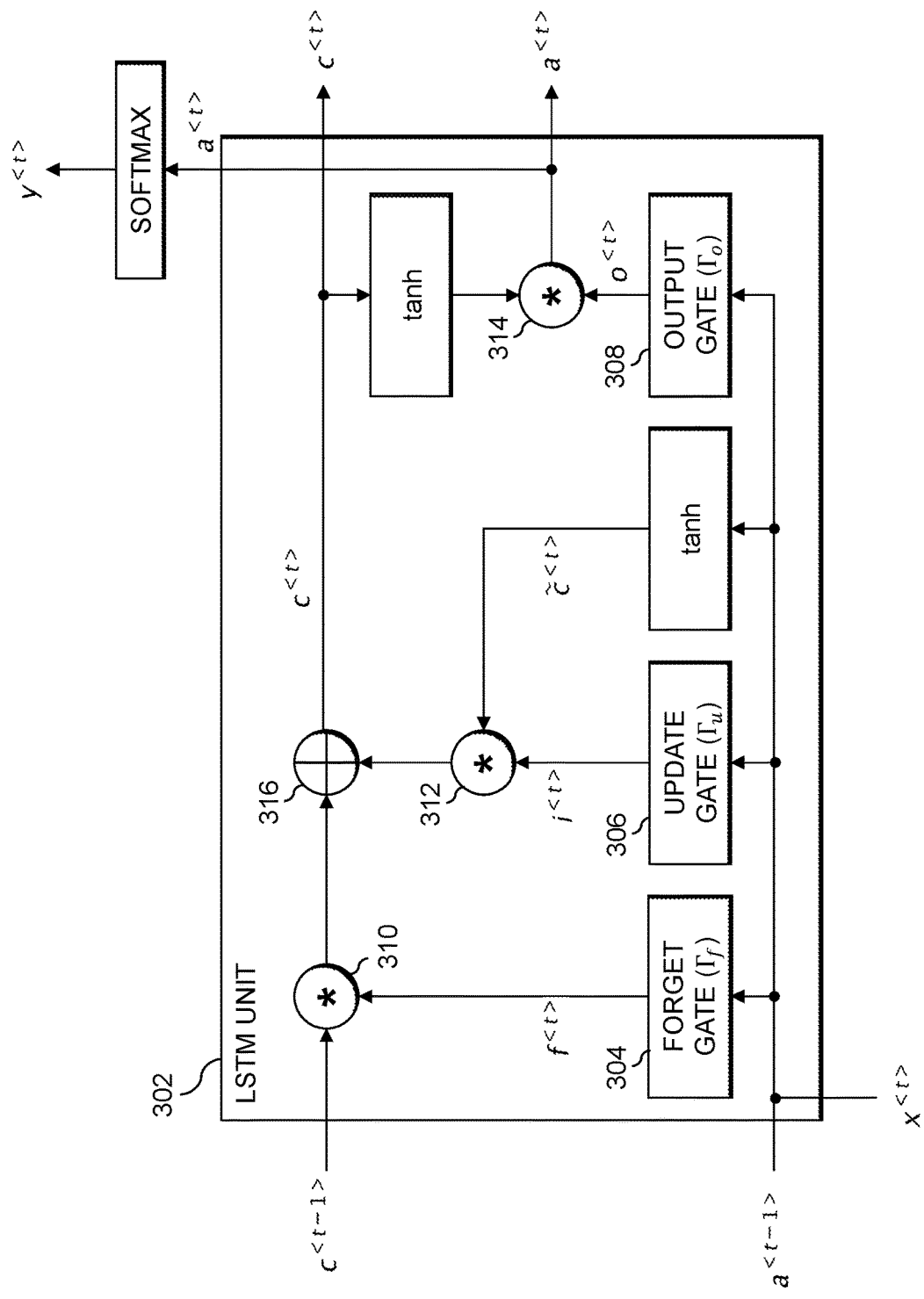
FIG. 3 shows an example of a recurrent unit of a machine learning framework.

FIG. 3 shows an example of a recurrent unit of a machine learning framework in an illustrative embodiment. More specifically, the recurrent unit corresponds to an LSTM unit 302 that includes a forget gate 304, an update gate 306, and an output gate 308. In addition, the LSTM unit 302 of FIG. 3 comprises multipliers 310-314 and an adder 316. LSTM units generally include memory cells and logic gates for updating the units with the most relevant information. More specifically, at each time step, t, the LSTM unit 302 uses the previous memory cells, denoted $c^{<t-1>}$, the last hidden state, $a^{<t-1>}$, and the current input $x^{<t>}$ to calculate new memory cells. Three logic gates (forget gate 304, update gate 306, and output gate 308) obtain the previous hidden state and current input as inputs. For example, the LSTM unit 302 can be implemented using the following set of equations:

$$\tilde{c}^{<t>} = \tanh(W_c[a^{<t-1>}, x^{<t>}] + b_c)$$
$$\Gamma_u = i^{<t>} = \sigma(W_u[a^{<t-1>}, x^{<t>}] + b_u)$$
$$\Gamma_f = f^{<t>} = \sigma(W_f[a^{<t-1>}, x^{<t>}] + b_f)$$
$$\Gamma_o = 0^{<t>} = \sigma(W_o[a^{<t-1>}, x^{<t>}] + b_o)$$
$$c^{<t>} = \Gamma_u * \tilde{c}^{<t>} + \Gamma_f * c^{<t-1>}$$
$$a^{<t>} = \Gamma_o * \tanh c^{<t>}$$

In the above equations, the terms $\Gamma_u$, $\Gamma_f$, and $\Gamma_o$ correspond to outputs of the update gate, the forget gate, and the output gate, respectively, and $b_c$, $b_u$, $b_f$, and $b_o$ are bias values. Some embodiments generate a new memory cell, $\tilde{c}^{<t>*}$, at each time step, where the update gate determines how much the new memory cell should be used, the forget gate determines how much of the previous memory cell should be ignored, and the output gate determines the hidden state. Each of these gates comprises a sigmoid function, a, which maps output values to be between 0 and 1.

At least some embodiments include generating one or more training datasets to train a machine learning framework (e.g., corresponding to elements 116 and/or 118 of anomalous code detection system 105) to detect one or more code anomalies. In some embodiments, the training datasets can be generated based on one or more available applications (e.g., open source applications). Such applications can include one or more known code anomalies or can be manually changed to include one or more anomalies. For example, a search can be performed to identify specific tokens on a corpus of source code of a given application to identify basic patterns associated with code anomalies, and a combination of syntax and logical errors can be added to the code. These portions of code can be labeled as anomalies so that the machine learning framework can learn to recognize patterns and contextual clues to determine whether a given portion of the source code is an anomaly or not.

As described elsewhere herein, source code can be converted into a natural language format, and thus the machine learning framework can learn to detect anomalies independent of the programming language that is used.

By way of example, consider the following code snippet:
 1: aVar=data·getDouble(A);
 2: bVar=data·getDouble(B);
 3: cVar=data·getDouble(C);

In this example, three variables (aVar, bVar, and cVar) are each assigned a distinct value corresponding to A, B, and C, respectively. Now, consider a user changing the above code to the following:
 1: aVar=data·getDouble(A);
 2: bVar=data·getDouble(A);
 3: cVar=data·getDouble(A);

This pattern of changes often corresponds to a copy-paste error, as the code was modified to set three distinct variables to the same value, which were previously set to different values.

Some embodiments can also learn to identify code anomalies based on the context and coding practices (e.g., standard coding practices and/or coding practices associated with a particular organization). As an example, consider the following code snippet: "lowest=np·abs(vec)·max( )". At least some embodiments can detect that the code snippet includes an anomaly based on the variable name ("lowest") and standard programming practices (e.g., using appropriate naming conventions) should have been written as follows: "lowest=np·abs(vec)·min( )." As yet another example, at least some embodiments can determine that the code snippet: "if (progressDialog·isShowingo && progressDialog !=null)", should have been written as "if (progressDialog !=null && progressDialog·isShowingo)" since the null check (corresponding to the !=operator) should be done first.

Embodiments described herein can be trained to recognize these and other types of errors, which are not typically detected by conventional code analysis techniques.

Figure 4:
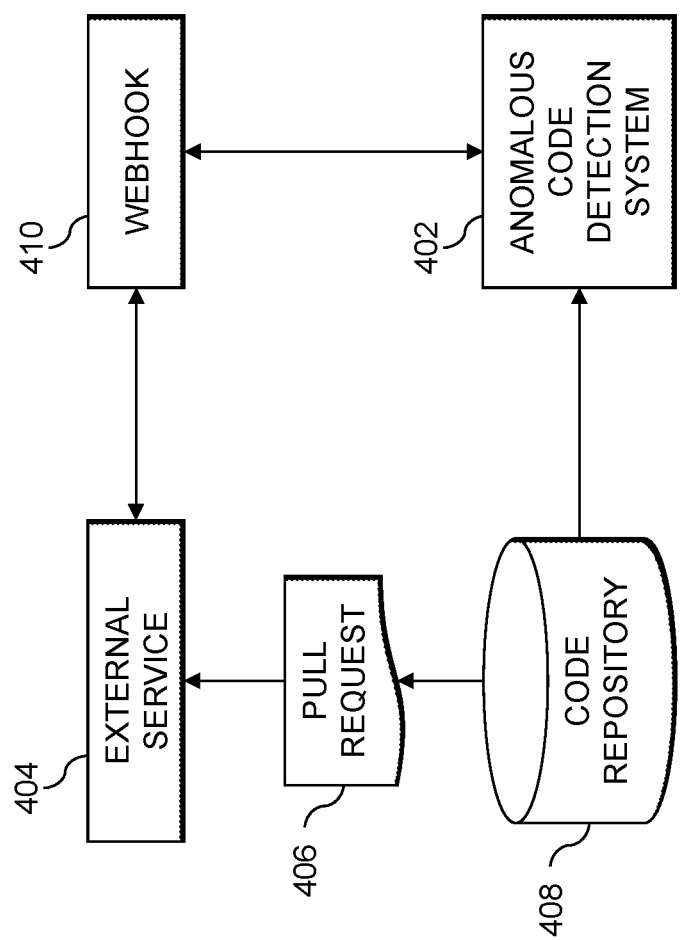
FIG. 4 shows an anomalous code detection system integrated into an external service in an illustrative embodiment.

FIG. 4 shows an anomalous code detection system 402 integrated into an external service in an illustrative embodiment. FIG. 4 includes the anomalous code detection system 402 (e.g., corresponding to the anomalous code detection system 105), an external service 404, a code repository 408, and a webhook 410. The webhook 410 generally is implemented as a software component that integrates the inputs and outputs of the anomalous code detection system 402 into the external service 404, which in some embodiments can correspond to an online code management service (e.g., GitHub). In one or more embodiments, a pull request 406 (e.g., in response to a user input) can provide the external service 404 with the one or more portions of code from the code repository 408, which are also provided to the anomalous code detection system 402. The anomalous code detection system 402 analyzes a set of code changes associated with the pull request 406 and can provide the external service 404 with information pertaining to any anomalies associated with the code changes, via the webhook 410.

Some embodiments can include performing (e.g., by the anomalous code detection system 105) one or more automated actions in response to identifying an anomaly. Such actions can include, for example, preventing one or more merge operations from occurring until the anomaly has been reviewed and/or remediated. By way of example, if a portion of code is detected as being an anomaly in a test environment, then a merge operation with a production environment that includes that code can be prevented until the anomaly has been reviewed and/or remediated. Also, some embodiments can include automatically creating a ticket in an issue tracking system that comprises information corresponding to a detected anomaly. The information may include, for example, a location of the anomaly (e.g., folder, file, and/or line number(s)), a developer or team of developers that authored (or modified) the code and/or are responsible for testing the code.

Figure 5:
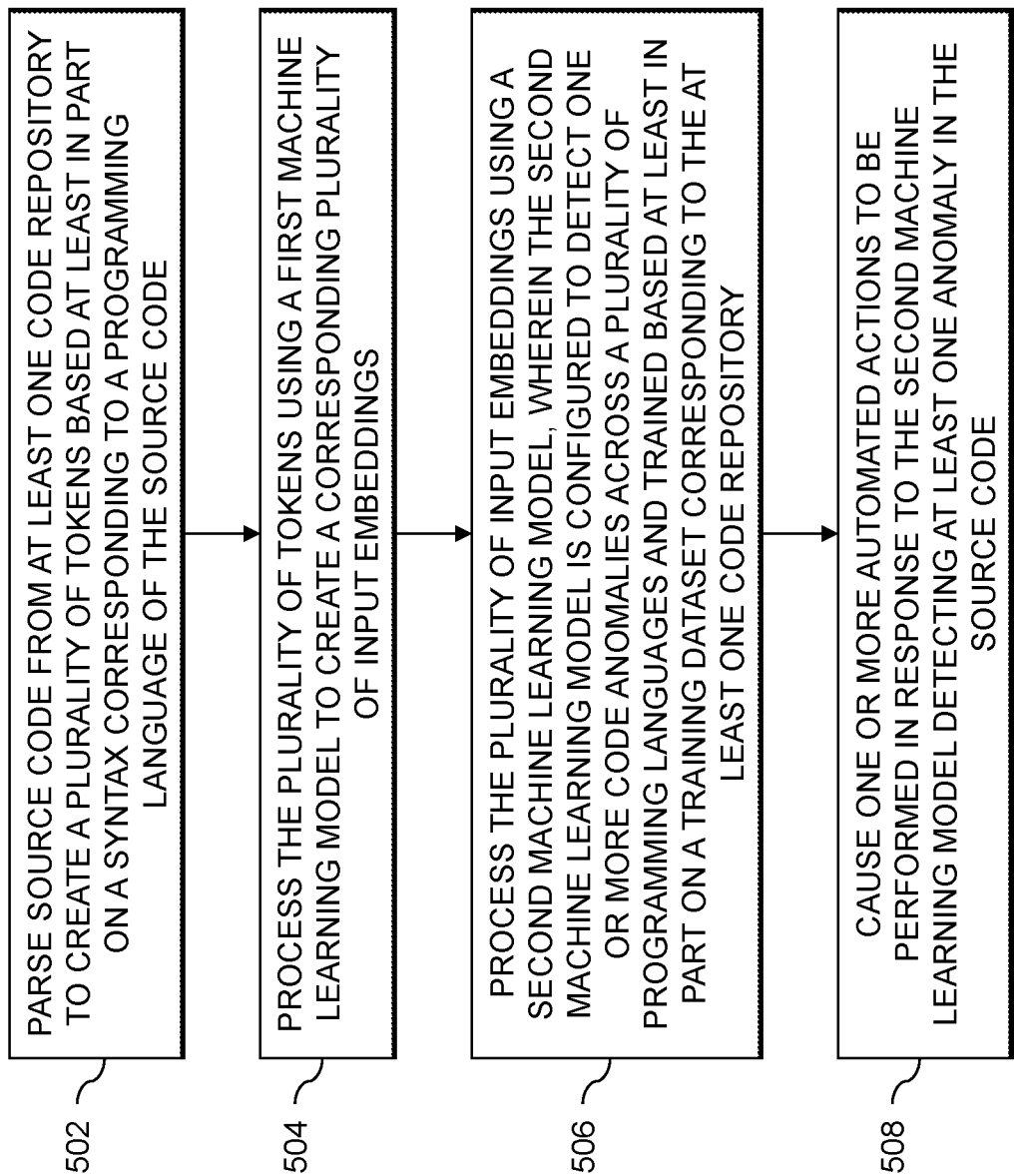
FIG. 5 shows a flow diagram of a process for detecting code anomalies using machine learning techniques in an illustrative embodiment.

FIG. 5 is a flow diagram of a process for detecting code anomalies using machine learning techniques in an illustrative embodiment. It is to be understood that this particular process is only an example, and additional or alternative processes can be carried out in other embodiments.

In this embodiment, the process includes steps 502 through 508. These steps are assumed to be performed by the anomalous code detection system 105 utilizing its elements 112, 114, 116, and 118.

Step 502 includes parsing source code from at least one code repository to create a plurality of tokens based at least in part on a syntax corresponding to a programming language of the source code.

Step 504 includes processing the plurality of tokens using a first machine learning model to create a corresponding plurality of input embeddings.

Step 506 includes processing the plurality of input embeddings using a second machine learning model, wherein the second machine learning model is configured to detect one or more code anomalies across a plurality of programming languages and trained based at least in part on a training dataset corresponding to the at least one code repository.

Step 508 includes causing one or more automated actions to be performed in response to the second machine learning model detecting at least one anomaly in the source code.

The first machine learning model may include at least one of a skip-gram neural network model and a transformer-based model. The second machine learning model may sequentially process the plurality of input embeddings, where a given input embedding is processed to consider a context of the given input embedding with respect to one or more of the other input embeddings. The second machine learning model may include at least one of a sequential machine learning model, a long short-term memory model, and a transformer-based model. The source code may correspond to a first version of at least one application, and the training dataset may be generated based at least in part on source code corresponding to at least one other version of the at least one application. The training dataset may be generated based at least in part on source code corresponding to one or more open-source applications having one or more known anomalies. The one or more code anomalies may correspond to at least one of a syntax anomaly and a logical anomaly. The parsing may include at least one of: removing one or more comments from the source code; replacing portions of the source code corresponding to the syntax of the programming language of the source code with corresponding tokens; and replacing at least one constant value in the source code with a generic token, wherein the generic token is based at least in part on a type of the at least one constant value. The one or more actions may include at least one of: modifying a portion of the source code to mitigate the detected at least one anomaly; preventing one or more merge operations corresponding to the source code from being performed; outputting information corresponding to the to at least one detected anomaly to at least one integrated developer environment; and automatically creating a ticket in a ticket tracking system comprising information corresponding to the detected at least one anomaly. The source code may be retrieved from a source code repository and include a set of code changes for at least one application.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to efficiently identify different types of errors in source code. These and other embodiments can effectively overcome problems associated with existing testing techniques that often use rule-based approaches and/or must be specially configured for different programming languages. For example, some embodiments are configured to parse and tokenize source code into a natural language format, which can then be analyzed using machine learning techniques to identify and remediate code anomalies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
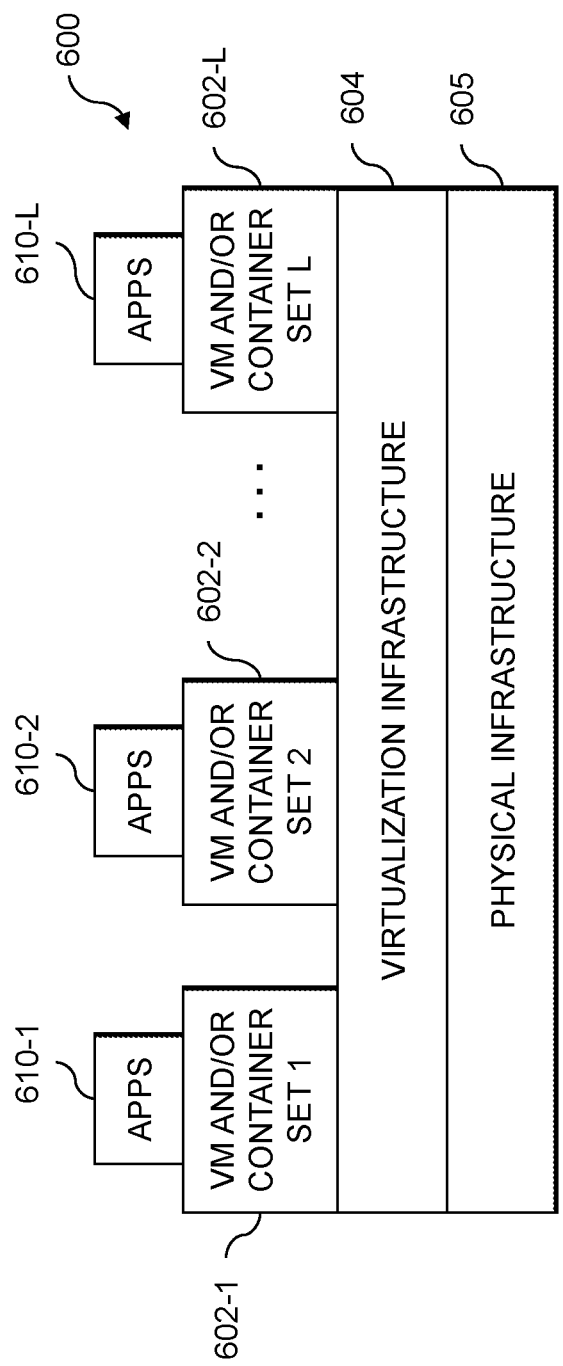
FIGS. 6 and 7 show examples of processing platforms that may be utilized to implement at least a portion of an information processing system in illustrative embodiments.
Figure 7:
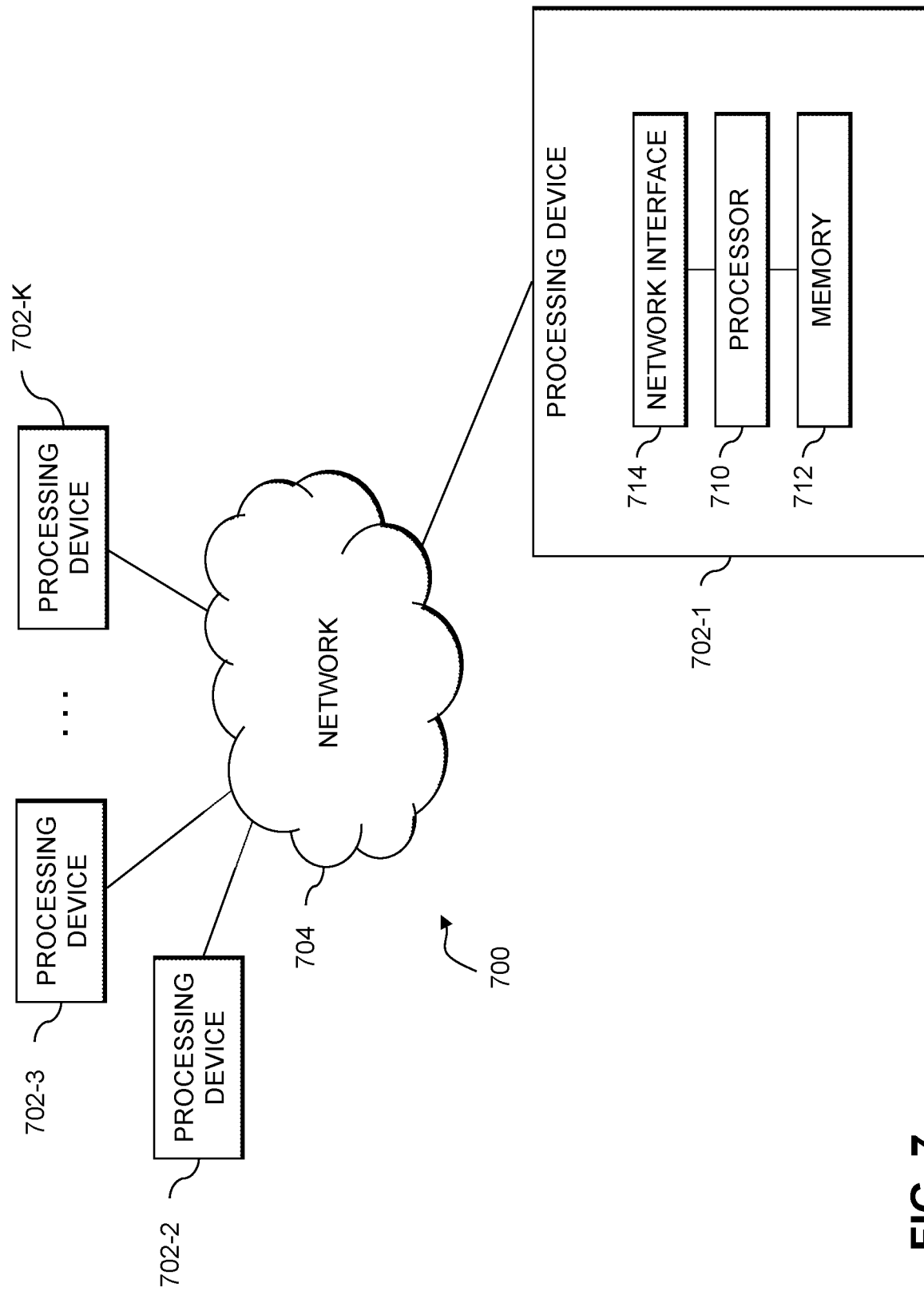

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    parsing source code from at least one code repository;
    tokenizing the parsed source code to create a plurality of tokens based at least in part on a syntax corresponding to a programming language of the source code, wherein the tokenizing comprises replacing portions of the parsed source code corresponding to the syntax of the programming language with corresponding natural language tokens;
    processing the plurality of tokens using a first machine learning model to create a corresponding plurality of input embeddings;
    processing the plurality of input embeddings using a second machine learning model, wherein the second machine learning model is configured to detect one or more code anomalies across a plurality of programming languages and trained based at least in part on a training dataset corresponding to the at least one code repository; and
    causing one or more automated actions to be performed in response to the second machine learning model detecting at least one anomaly in the source code;
    wherein the method is performed by at least one processing device comprising a processor coupled to a memory.

2. The computer-implemented method of claim 1, wherein the first machine learning model comprises at least one of a skip-gram neural network model and a transformer-based model.

3. The computer-implemented method of claim 1, wherein the second machine learning model sequentially processes the plurality of input embeddings, wherein a given input embedding is processed to consider a context of the given input embedding with respect to one or more other input embeddings in the plurality of input embeddings.

4. The computer-implemented method of claim 1, wherein the second machine learning model comprises at least one of a sequential machine learning model, a long short-term memory model, and a transformer-based model.

5. The computer-implemented method of claim 1, wherein the source code corresponds to a first version of at least one application, and wherein the training dataset is generated based at least in part on source code corresponding to at least one other version of the at least one application.

6. The computer-implemented method of claim 1, wherein the training dataset is generated based at least in part on source code corresponding to one or more open source applications having one or more known anomalies.

7. The computer-implemented method of claim 1, wherein the one or more code anomalies correspond to at least one of a syntax anomaly and a logical anomaly.

8. The computer-implemented method of claim 1, wherein at least one of:
    the parsing comprises removing one or more comments from the source code; and
    the tokenizing comprises replacing at least one constant value in the source code with a generic token, wherein the generic token is based at least in part on a type of the at least one constant value.

9. The computer-implemented method of claim 1, wherein the one or more automated actions comprise at least one of:
    modifying a portion of the source code to mitigate the detected at least one anomaly;
    outputting information corresponding to the detected at least one anomaly to at least one integrated developer environment; and
    automatically creating a ticket in a ticket tracking system comprising information corresponding to the detected at least one anomaly.

10. The computer-implemented method of claim 1, wherein the source code is retrieved from a source code repository and comprises a set of code changes for at least one application.

11. The computer-implemented method of claim 1, wherein a given one of the corresponding natural language tokens comprises a natural language description of the corresponding portion of the parsed source code.

12. A non-transitory processor-readable storage medium having stored therein program code of one or more software programs, wherein the program code when executed by at least one processing device causes the at least one processing device:
    to parse source code from at least one code repository;
    to tokenize the parsed source code to create a plurality of tokens based at least in part on a syntax corresponding to a programming language of the source code, wherein the tokenizing comprises replacing portions of the parsed source code corresponding to the syntax of the programming language with corresponding natural language tokens;
    to process the plurality of tokens using a first machine learning model to create a corresponding plurality of input embeddings;

to process the plurality of input embeddings using a second machine learning model, wherein the second machine learning model is configured to detect one or more code anomalies across a plurality of programming languages and trained based at least in part on a training dataset corresponding to the at least one code repository; and to cause one or more automated actions to be performed in response to the second machine learning model detecting at least one anomaly in the source code.

13. The non-transitory processor-readable storage medium of claim 12, wherein the first machine learning model comprises at least one of a skip-gram neural network model and a transformer-based model.

14. The non-transitory processor-readable storage medium of claim 12, wherein the second machine learning model sequentially processes the plurality of input embeddings, wherein a given input embedding is processed to consider a context of the given input embedding with respect to one or more other input embeddings in the plurality of input embeddings.

15. The non-transitory processor-readable storage medium of claim 12, wherein the second machine learning model comprises at least one of a sequential machine learning model, a long short-term memory model, and a transformer-based model.

16. The non-transitory processor-readable storage medium of claim 12, wherein the source code corresponds to a first version of at least one application, and wherein the training dataset is generated based at least in part on source code corresponding to at least one other version of the at least one application.

17. An apparatus comprising:
at least one processing device comprising a processor coupled to a memory;
the at least one processing device being configured:
to parse source code from at least one code repository;
to tokenize the parsed source code to create a plurality of tokens based at least in part on a syntax corresponding to a programming language of the source code, wherein the tokenizing comprises replacing portions of the parsed source code corresponding to the syntax of the programming language with corresponding natural language tokens;
to process the plurality of tokens using a first machine learning model to create a corresponding plurality of input embeddings;
to process the plurality of input embeddings using a second machine learning model, wherein the second machine learning model is configured to detect one or more code anomalies across a plurality of programming languages and trained based at least in part on a training dataset corresponding to the at least one code repository; and
to cause one or more automated actions to be performed in response to the second machine learning model detecting at least one anomaly in the source code.

18. The apparatus of claim 17, wherein the first machine learning model comprises at least one of a skip-gram neural network model and a transformer-based model.

19. The apparatus of claim 17, wherein the second machine learning model sequentially processes the plurality of input embeddings, wherein a given input embedding is processed to consider a context of the given input embedding with respect to one or more other input embeddings in the plurality of input embeddings.

20. The apparatus of claim 17, wherein the second machine learning model comprises at least one of a sequential machine learning model, a long short-term memory model, and a transformer-based model.

* * * * *